(12) United States Patent
Childs et al.

(10) Patent No.: US 6,374,242 B1
(45) Date of Patent: Apr. 16, 2002

(54) NATURAL-LANGUAGE INFORMATION PROCESSOR WITH ASSOCIATION SEARCHES LIMITED WITHIN BLOCKS

(75) Inventors: Lois Catherine Childs, Yardley; David Steven Dadd, West Chester, both of PA (US); Norris Harber Heintzelman, Wilmington, DE (US)

(73) Assignee: Lockheed Martin Corporation, King of Prussia, PA (US)

( * ) Notice: Subject to any disclaimer, the term of this patent is extended or adjusted under 35 U.S.C. 154(b) by 0 days.

(21) Appl. No.: 09/408,983

(22) Filed: Sep. 29, 1999

(51) Int. Cl.[7] .............................................. G06F 17/30
(52) U.S. Cl. .................. 707/6; 707/3; 707/6; 707/503; 707/516; 706/45; 706/62
(58) Field of Search ........................ 707/3, 4, 6, 104.1, 707/1, 7.9, 10, 501.1, 503, 512, 513, 516; 716/8, 10; 706/45, 62

(56) References Cited

U.S. PATENT DOCUMENTS

| | | | | |
|---|---|---|---|---|
| 5,604,854 A | * | 2/1997 | Glassey ....................... 707/503 |
| 5,848,416 A | * | 12/1998 | Tikkanen ..................... 707/101 |
| 5,852,819 A | * | 12/1998 | Beller ............................ 707/1 |
| 5,963,956 A | * | 10/1999 | Smartt ......................... 707/104 |
| 6,100,985 A | * | 8/2000 | Scheiner et al. ............. 356/381 |
| 6,134,539 A | * | 10/2000 | O'Connor et al. ............. 706/45 |
| 6,281,974 B1 | * | 8/2001 | Scheiner et al. ............. 356/381 |
| 6,292,809 B1 | * | 9/2001 | Edelman ...................... 707/503 |
| 6,292,810 B1 | * | 9/2001 | Richards ...................... 707/503 |

OTHER PUBLICATIONS

Guerra, Concettina, "Survey of Parallel Algorithms for Structural Pattern matching", Proceedings of the 12th IAPR International Conference on Pattern Recognition, 1994, vol. 3—Conference C: Signal Processing, pp. 275–278.*

Sartipi, Kamran et al., "A Pattern Matching Framework for Software Architecture Recovery and Restructuring", Proceedings of the 8th International Workshop on Program Comprehension, IWPC 2000, Jun. 10–11, 2000, pp. 37–47.*

"An Evaluation of Coreference Resolution Strategies for Acquiring Associated Information", by Lois c. Childs, published at pp. 179–184 in Advanced in Text Processing Tipster Program Phase II, Apr. 1994–Sep. 1996.

* cited by examiner

Primary Examiner—Hosain T. Alam
Assistant Examiner—Shahid Alam
(74) Attorney, Agent, or Firm—Duane Morris LLP

(57) ABSTRACT

A block finder operates on one-dimensional digitized text, to group together those portions which are likely to contain related subjects matter, and to mark the grouped portions so that, at a later step of natural-language processing, only that block within which a word is found is searched for a related words or words. The block finder (210) extracts two-dimensional symbols, such as paragraph symbols (314), from the text, and stores the text in a grid of cells of a "two-dimensional" memory. All of the grid locations are classified as text (T) or space (white or W). Prefiltering (316) of the text deletes white spaces between sentences. Boundaries of the block are identified by examining each cell, and at least some of its adjoining cells, and identifying as an edge those boundaries between cells in which a transition between T and W occurs. This results in a list of unit-length boundary edges with top, bottom, left or right attributes. The unit-length boundary edges of each attribute are formed into longer edges identified by attribute and end points. Closed regions are formed by joining each top with those two left and right boundaries having identical end points, and those in turn are joined with top or bottom boundaries having common end points. The result is a closed region, which may have jagged edges. The block is simplified by determining two corner locations of a bounding box. Searching is performed for associated entities (words or phrases) within the same bounding box.

9 Claims, 9 Drawing Sheets

UNCLASSIFIED (FBIS REPORT) THE FOLLOWING IS A SUMMARY OF REPORTS ON DEVELOPMENTS MONITORED THROUGH 21 AUGUST.

COLUMBIA

POLICE SEIZED 500 KG OF COCAINE IN CALI ON 1 AUGUST. FIVE PEOPLE WERE ARRESTED. THE MAGDALENA POLICE SEIZED 15 KG OF COCAINE IN A TRUCK ON HIGHWAY 33.

EL SALVADOR

LOCAL AUTHORITIES SEIZED 21.5 MILLION COLONES IN DRUGS OVER THE WEEKEND.

FIG. 6a.

NATURAL-LANGUAGE INFORMATION PROCESSOR WITH ASSOCIATION SEARCHES LIMITED WITHIN BLOCKS

FIELD OF THE INVENTION

This invention relates to information extraction from natural language text, and more particularly to a block finder for interpreting the structure of text documents in relation to their content, for aiding in establishing search blocks for information extraction.

BACKGROUND OF THE INVENTION

Many organizations maintain databases of information which they believe to be important to their functions. Formerly, such organizations might employ people to read newspaper and magazine articles and other text reports, and to summarize the information in the relevant database, whatever its form. More recently, the advent of computerized systems has made it possible to perform some of these tasks by use of information extraction or natural-language processing software operating on digitized text. The digitized text can be generated by optical scanning of paper reports to produce and using character recognition software. As an alternative, the digitized text may be derived from on-line publications, as on the internet.

Natural-language processing systems or software attempt to extract information from digitized text by a variety of techniques, including linguistic parsing, pattern matching, statistical methods, or a combination thereof. These information extraction systems tend to apply a serial view of the text to be processed, in that one character follows another in the stream of text. This serial approach is limited in its ability to utilize an author's formatting clues to understand the correct grouping of the extracted information. For example, newspaper text is usually arranged in the form of paragraphs within columns. If an automatic information extraction system were to ingest and operate on this text without some idea of the boundaries of each story, it might incorrectly group unrelated information, such as news of a visit by a foreign dignitary with that of a drug lord's arrest. Natural-language processing systems are useful, but the art is not well advanced at this time.

Improved natural-language processors are desired.

SUMMARY OF THE INVENTION

An information extracting block finding method determines the structure of documents represented by one-dimensional text files. Most (if not all) computer files are stored as a one-dimensional sequence of characters. The method includes the step of extracting from the text files at least some symbols representing two-dimensional spatial information. The text file is at least temporarily stored, using the spatial information, in a memory having a two-dimensional structure of grid cells. For at least some of the grid cells, at least two grid cells orthogonally adjacent to the grid cell under consideration are examined. Each such grid cell under consideration is assigned at least one of (or from 0 to 4 of), (a) left, (b) right, (c) top, and (d) bottom edge attributes: the attributes are assigned to those boundaries between the grid cell under examination in which one of (a) the grid cell under examination includes a text symbol and the adjacent cell to the left lacks a text symbol, (b) the grid cell under examination includes a text symbol and the adjacent cell to the right lacks a text symbol, (c) the grid cell under examination includes a text symbol and the adjacent cell above the cell under examination lacks a text symbol, and (d) the grid cell under examination includes a text symbol, and the adjacent cell below the cell under examination lacks a text symbol, respectively. This generates a list of cell edges, each defined by its edge attribute and its end locations on the 2D grid. Cell edges having the same left, right, top, or bottom edge attribute and sharing a common end point are combined or joined, to thereby form left, right, top and bottom block edges. A block edge is defined by its edge attribute and the location of its endpoints. Block edges are distinguished from cell edges by the fact that they can have a length exceeding unity. Each top and bottom block edge is associated with those left and right edges having common end points therewith, to form closed two-dimensional regions. The spatial coordinates of a bounding box about each of the closed two-dimensional regions are determined. The block structure information thus produced may be used in various ways by the natural language processor. It can be used to refine the segmentation of the document ending sentences and paragraphs even when proper punctuation is not provided in the text. The blocking information can also be used to put a two-column document into reading order. When searching in the text for an information element which is associated with a particular other information element, the search is performed in that one of the bounding boxes which contains the other information element.

In a particular mode of the method, the step of determining the spatial coordinates of a bounding box includes the steps of identifying (i) the upper-left corner of the bounding box, and (ii) the lower-right corner of the bounding box. The upper-left corner is identified by selecting that point which represents the spatial coordinates of the intersection of (a) the projection of the topmost upper edge of the closed region with (b) the projection of the leftmost of the left edges of the closed region. The lower-right corner is identified as that point which represents the spatial coordinates of the intersection of (a) the projection of the lowermost lower edge of the closed region with (b) the projection of the rightmost of the right edges of the closed region.

In a particular version of the method, the step of performing the search includes the step of performing the search for the information element associated with a pronoun to that one of the bounding boxes including the pronoun.

In a preferred mode of the method of the invention, the text is prefiltered to eliminate single and double spaces between sentences. This step can be done before the step of examining grid cells and assigning edge attributes. The prefiltering may include the step of deeming to be a cell occupied by text each grid cell which is occupied by a space symbol and which is (a) bounded on the left by a text grid cell and (b) bounded on the right by a text grid cells including space symbols. The preferred method also includes the step of deeming to be a set of four text cells (TTTT) those cells having the form TWWT, where T represents a text cell, and W represents a space or white cell. More particularly, this includes deeming to be a set of four text cells all right-left space symbol grid cell pairs bounded to the right and left by text characters.

BRIEF DESCRIPTION OF THE DRAWING

FIG. 6a is representative input text.

DESCRIPTION OF THE INVENTION

Figure 1:
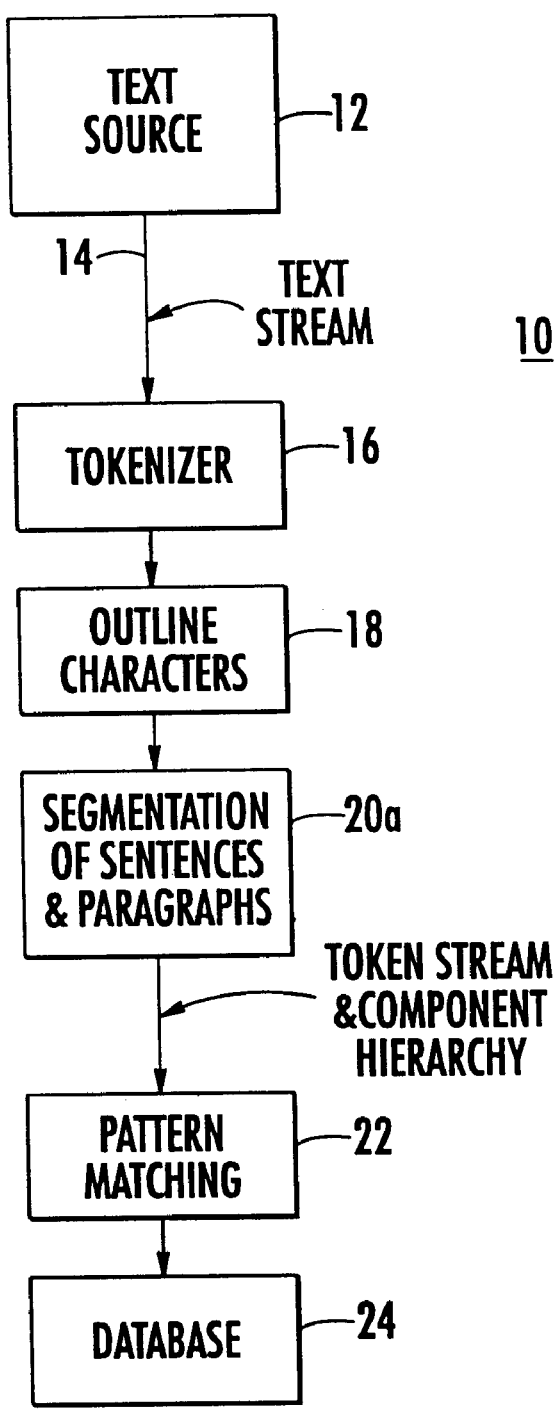
FIG. 1 is a simplified block diagram of a prior-art information handling system.

In FIG. 1, a data handling, extraction, and storage arrangement, designated generally as 10, includes a block 12 which represents a source of digitized text, such as an optical-character recognition system operating on hard-copy input, or a stream of text data, as might be provided by an on-line source. The resulting stream of digitized text is applied by way of a path 14 to a block 16. Block 16 represents a tokenizer, which converts the character symbols in the text stream into a sequence of text symbols. More particularly, the sequence of text symbols entering the tokenizer may include letters, numbers, punctuation and other symbols, and spaces. The tokenizer organizes or groups the input data into words. The tokenizer simultaneously outputs all character symbols which are not separated by space, paragraph, punctuation, or number symbols. Thus, a series of input symbols including the letters {"d" "o" "g"} would result in the word "dog" being outputted from the tokenizer. It should be understood that, while the system will operate from a time sequence text stream, its normal operation will be on a file in which all of the characters are present simultaneously, as in a computer file.

The stream of words from tokenizer block 16 of FIG. 1 is applied to an outline character recognition block 18, which attempts to identify symbols used to differentiate between sections of a document. For example, some documents may use roman numerals to identify the beginning of each major section of the text, other documents may use capital letters, or numerals, for the same purpose. The outline characters, if identified, and the tokenized information, are applied together to a segmentation block 20a. Details of segmentation block 20a are described below in conjunction with FIG. 7a. Segmentation block 20a identifies the beginnings and ends of sentences and paragraphs by identification of the appropriate symbols. A sentence is often identifiable as having a capital letter at its beginning and a period at its end. A paragraph may be identified by a hard return following a sentence end, or possibly by an indent following a hard return. The segmented data stream, including a stream of tokens and component hierarchy information, is applied from block 20a to a pattern matching block 22, which performs an iterative process. The pattern matching block 22 first classifies tokens into entities such as names, dates, locations, amounts, and the like, and then groups them by proximity. For example, in an application to extract information concerning earthquakes, the pattern matcher seeks occurrences of the word "earthquake" and associates the occurrence with numbers and locations that are found near the occurrence. Thus, a sentence reading in part "earthquake of magnitude 8.3 on the Richter scale occurred in Japan" would extract the "8.3" and "Japan" portions for entry into the database. The pattern matching may be simple, as in the above example, or it may be more complex, as for example by searching out a number lying within five words of the word "Richter." The information extracted by the pattern matching block 22 is provided to database 24 for storage therein, for later use.

Systems such as that described in conjunction with FIG. 1 are known, and are described, for example, in an article entitled An Evaluation of Coreference Resolution Strategies for Acquiring Associated Information, by Lois C. Childs, published at pp 179–184, in Advances in Text Processing TIPSTER PROGRAM phase II, April 1994-September 1996.

Figure 2:
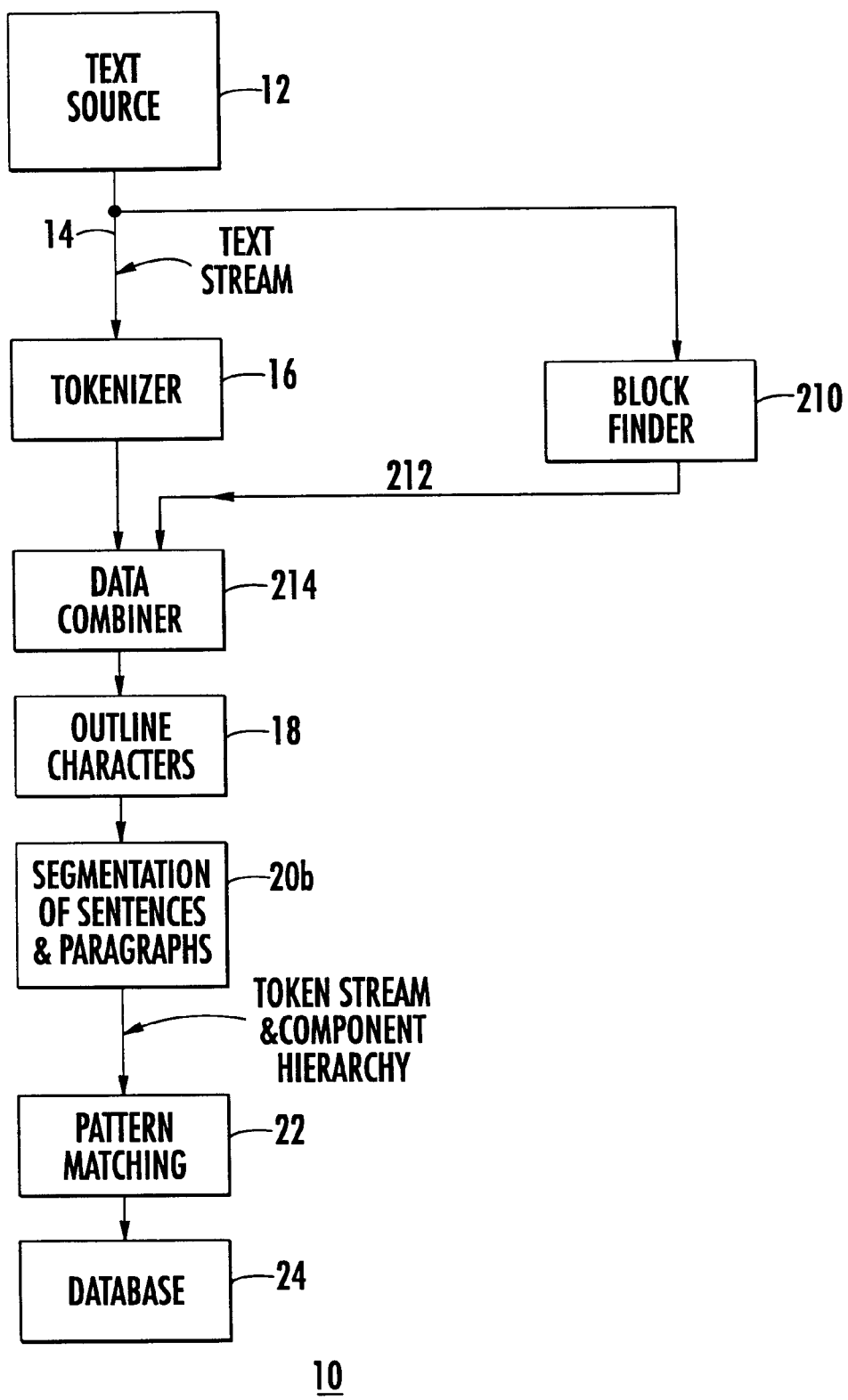
FIG. 2 is a simplified block diagram of an information handling system according to an aspect of the invention.

FIG. 2 is a simplified block diagram of a system in accordance with an aspect of the invention. FIG. 2 is generally similar to FIG. 1, but differs in three respects. First, the arrangement of FIG. 2 includes a further "block finder" block 210 according to an aspect of the invention, and second, some changes are made to the sentence segmentation block, so that the sentence segmentation block is designated 20b in FIG. 2, rather than 20a. The third change from FIG. 1 is the addition of block 214, the data combiner. Details of sentence segmentation block 20b are described below in conjunction with FIG. 7b. Block finder 210 processes the text stream produced by text source 12, as described in more detail below, for detecting or interpreting the structure of the input text, for generating blocking or structure information which can be used by the pattern matching block 22 to, among other things, limit its searches. The resulting text structure information is in the form of a stream of corner locations which identify the text blocks as established by the block former 210. The identification of a block of related text can be identified by the "upper left" and "lower right" corner locations.

The data combiner (block 214) inerts block structure tokens into the text. It also puts the tokens into reading order. Consider its operation on the following text:

| THE CAT | WRITTEN BY |
| IN THE HAT | DR. SEUSS | which is organized by the tokenizer 16 of FIGS. 1 or as
  1. THE
  2. CAT
  3. WRITTEN
  4. BY
  5. IN
  6. THE
  7. HAT
  8. DR.
  9. SEUSS
After the insertion of blocking information and token reordering of block 214 outputs:

1. *START BLOCK*
2. THE
3. CAT
4. IN
5. THE
6. HAT
7. *END BLOCK*
8. *START BLOCK*
9. WRITTEN
10. BY
11. DR.
12. SEUSS
13. *END BLOCK*

Figure 3:
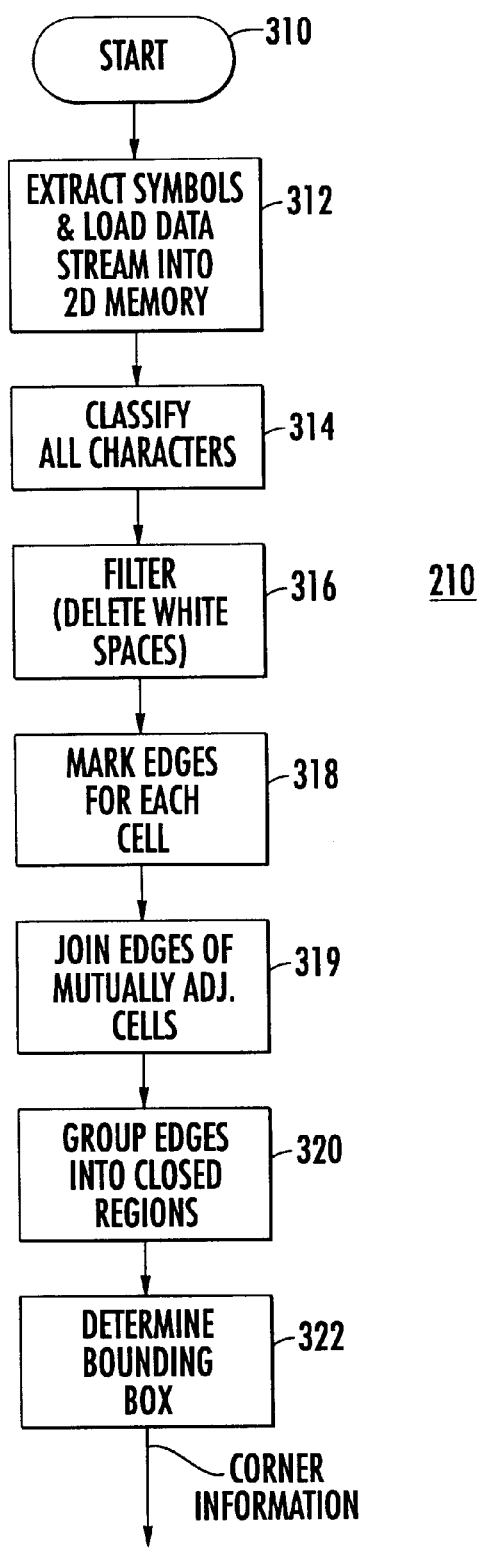
FIG. 3 is a simplified flow chart illustrating operation of a portion of the system of FIG. 2.

FIG. 3 is a simplified flow chart illustrating the operation of the block finder block 210 of FIG. 1. In FIG. 3, the logic flow starts at a START block 310, and proceeds to a block 312, which represents loading the symbols of the incoming text stream into a memory having a two-dimensional structure, effectively corresponding to the page on which the text would appear if it were printed or displayed. Thus, a character following a carriage return symbol would be stored in a memory location corresponding to the left edge of a page, and all the following characters, as far as, and including, the next carriage return, would be stored in that portion of the memory corresponding to the same line of text. For simplicity of explanation, the description of memory locations assumes that the memory is "rectangular." Each character, then, is stored in a grid cell of the memory, in a position corresponding to its position on the page. In the case of non-displayed symbols, the storage location ideally corresponds to its spatial location relative to nearby text symbols. It should be noted that the carriage return symbol of each line is stored at a memory cell which is in addition to the cells representing visible portions of the page or text file. In other words, the memory associated with block 312 contains at least one cell at the right of each line of visible cells, in which the carriage return is stored, for reasons set forth below.

Figure 6B:
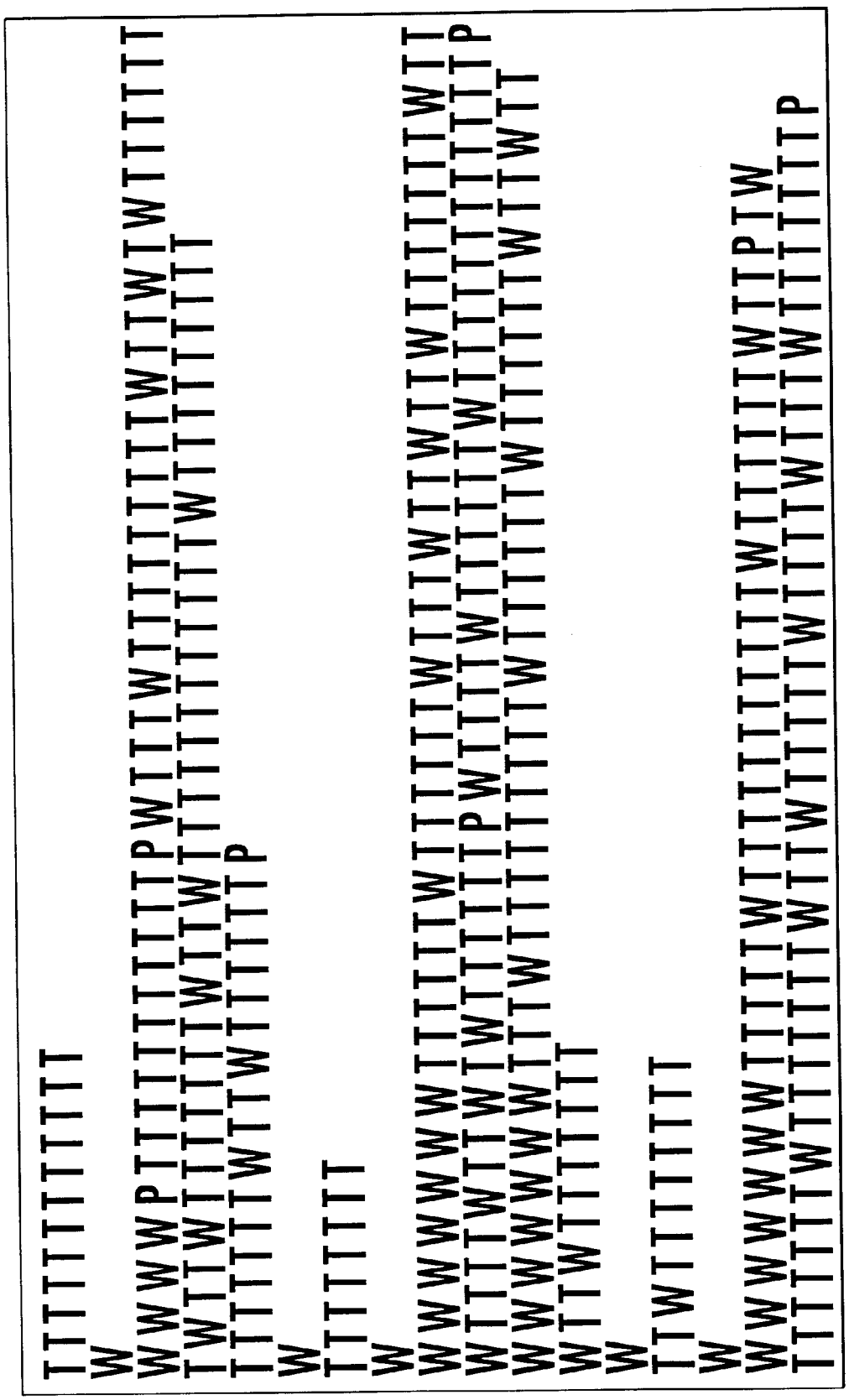
FIG. 6b represents the block of text of FIG. 6a after classification of the characters.

From step 312 of FIG. 3, the logic flows to a block 314, which represents classification of each of the symbols stored in a grid point of memory as one of (a) a text or displayed symbol, (b) a punctuation symbol, and (c) a white or blank space. A white space corresponds, for example, to a space between words, or possibly to the region between the end of a sentence and the carriage return representing a new line. FIG. 6a represents input text which may be applied to block 314, and FIG. 6b represents the result of classification in block 314. The classification performed in block 314 aids in performing the filtering of the next step of the method, represented by block 316. Block 316 effectively reclassifies, as text, one or two white spaces between words or sentences, so that the sentences run together without intervening spaces. This filtering tends to reduce the number of spurious edges, which are those which are not needed in order to determine the locations of the edges of the block.

Figure 6C:
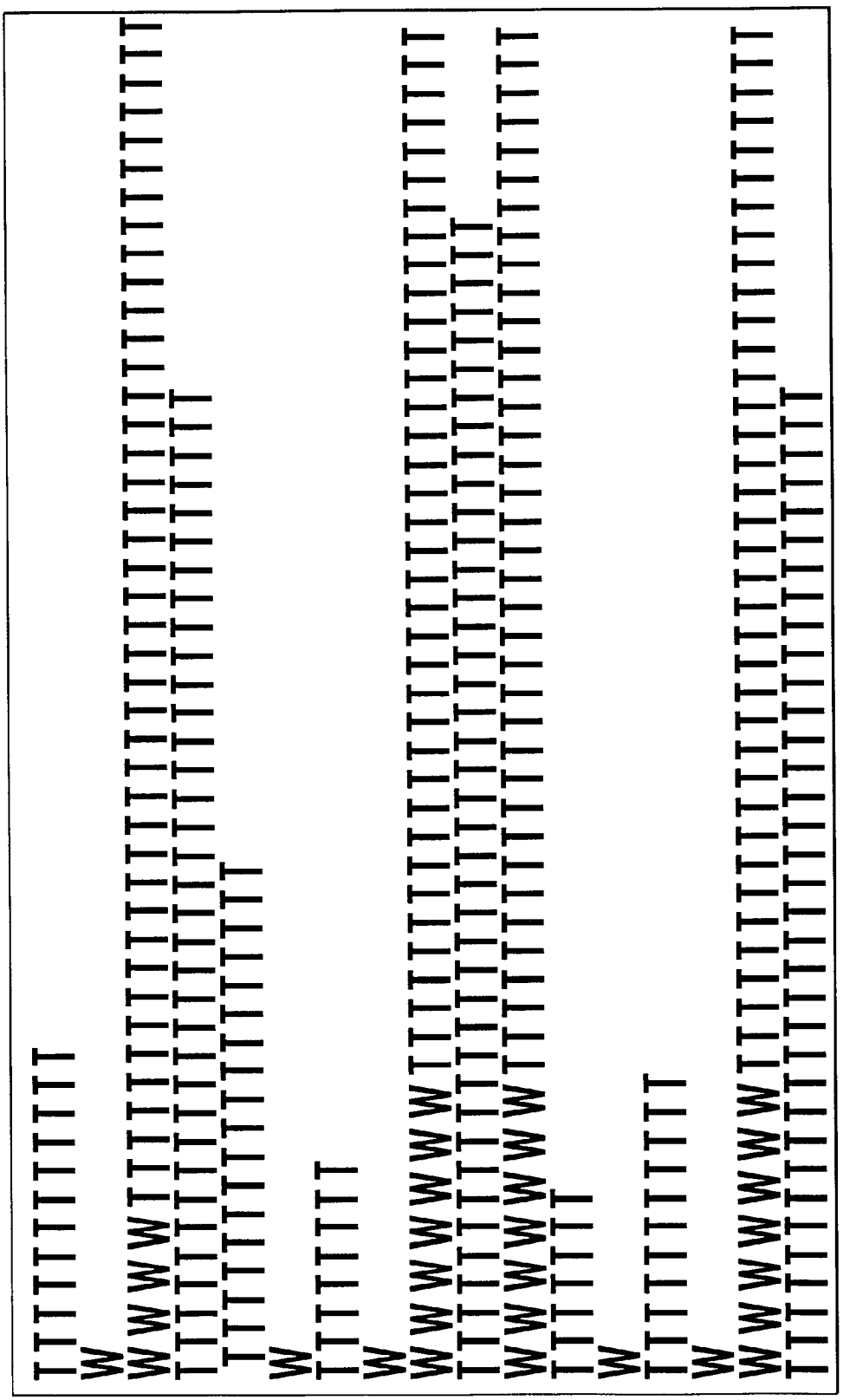
FIG. 6c represents the classified text of FIG. 6b after filtering.

In an actual embodiment of the invention, the white spaces between sentences are filtered out in block 316 of FIG. 3 by initially looking for the sequence "TWT" in adjacent grid locations, where "T" represents a text symbol, and "W" represents a white space; all such patterns are reclassified as "TTT." The next step is to look for all occurrences of the pattern "TPWW," where P is a punctuation mark, and convert all such patterns to "TTTT." FIG. 6c represents the result of applying the filtering of block 316 to the classified text of FIG. 6b.

From block 316 of FIG. 3, the logic flows to a block 318, which represents the identification of all relevant edges of each memory cell, as a preliminary to the determination of the locations of the edges of the block of text which is deemed to be related. The beginning of each communication will normally be represented by a capital letter or a tab, but may be any symbol, including a white space. Initially, each cell is examined, and at least the next adjacent cells on two sides are examined in conjunction with the cells under examination. The desired information relates to the existence or nonexistence of a boundary of related information, and so, if present, such boundary information lies in the content of a cell compared with the content of adjoining cells, or in other words the desired information is "edge" information. Since all grid cells are examined, it is sufficient if (a) top or bottom and (b) left or right "edges" of each cell are determined.

Figure 4A:
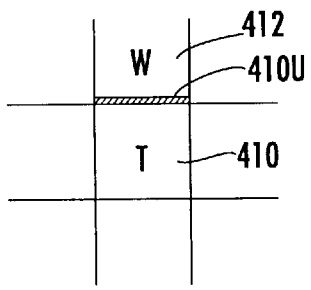
FIG. 4a is a simplified representation of a portion of a grid in which the cell under consideration includes a text symbol, and the next adjacent upper grid space is a white space, showing the location of a unit-length upper edge.
Figure 4C:
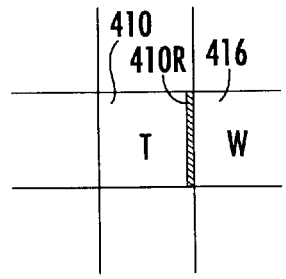
FIG. 4c represents a portion of a grid in which the cell considered includes text, and the next adjacent right grid space is white, showing the unit-length right edge.
Figure 4B:
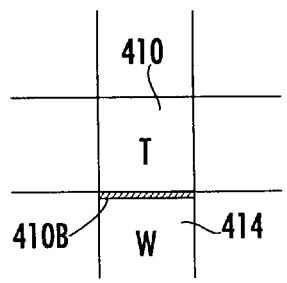
FIG. 4b represents a portion of a grid in which the cell under consideration includes text, and the next adjacent lower grid space is a white space, showing the location of a unit-length lower edge.
Figure 4D:
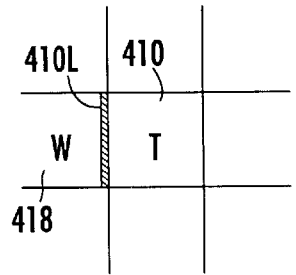
FIG. 4d represents a text cell, with a white adjacent left grid space, showing the unit-length left edge.

FIG. 4a represents a text cell 410 lying in the memory grid, with the next adjacent cell being 412. For this case, the upper "edge" information relating to cell 410 may be considered to lie in upper edge region 410U of the cell under consideration. FIG. 4b represents text cell 410, with the next lower adjacent cell being 414. For this case, the lower edge information relating to cell 410 may be considered to lie in bottom edge region 410B of the cell under consideration. Similarly, FIG. 4c represents text cell 410, with the next adjacent cell to the right being 416. For this case, the right edge information relating to cell 410 may be considered to lie in right edge region 410R of the cell under consideration. FIG. 4d represents text cell 410, with the next adjacent cell to the left being 418. For this case, the left edge information relating to cell 410 may be considered to lie in left edge region 410L of the cell under consideration. If the cell under examination is a text (T) cell, as in FIGS. 4a, 4b, 4c, and 4d, and it is assumed that top and left edges are to be determined for each cell, it is not necessary to refer to FIGS. 4b and 4c, and all the relevant information can be determined for cells lying in the main portion of the memory grid by examining only information equivalent to that in FIGS. 4a and 4d.

Referring to FIG. 4a, the text (T) cell under examination is 410, and the next cell above cell 410 is a W cell 412, so there is a transition between text and non-text information in the vertical direction in FIG. 4a, which results in the existence of an upper edge (as to cell 410) designated 410U. If cell 412 were to contain text (T), then the text cell 410 under consideration would have a next adjoining text cell, and there would be no upper edge associated with cell 410. Referring to FIG. 4d, the text (T) cell under examination is 410, and the next cell to the left of cell 410 is a W cell 412, so there is a transition between text and non-text information in the horizontal direction in FIG. 4d, which results in the existence of a left edge (as to cell 410) designated 410L. The determination of the upper and left edges for each cell, together with special rules for certain situations, results in determination of all the edges of the text being blocked. In the situation of a white cell under consideration, a left edge can be viewed as a right edge of the next adjacent cell to its left. It should particularly be noted that, since the edges are identified by their locations, they are not associated with any particular one of the adjoining cells. As mentioned, that which is sought is edges, and no edge exists between mutually adjacent white cells or mutually adjacent text cells.

The special rules adverted to above include one which is applied for the first-line situation, in that examination of each cell for an upper edge cannot be performed in the case of cells lying at the upper edge of the memory, but rather, an upper edge is assigned to, or deemed to exist for, each text cell. If the first cell of a line is a white space, no edge is placed to its left, whereas if the first cell of a line is a text symbol, an edge is placed at its left edge. For the last line of a text file, a bottom edge is assigned to all text cells, as for example by effectively adding a further lower line of white cells. A carriage return symbol is treated as a white cell, so that an edge is generated between it and the next T cell to its left, thereby providing a right edge to the line of text.

The length-one edges of the cells as determined in block 318 of FIG. 3 are identified by the attributes of (a) orientation, which is to say left, right, top, or bottom, and (b) location. The left and right orientations correspond to vertical edges of the block of text in the process of being identified, and the top or bottom orientations correspond with horizontal edges of the block. The location information associated with each edge is specified by an x and y coordinate which corresponds to the upper left corner of the gridpoint location (x,y). Thus, in this embodiment, the edge location is related to, but does not exactly coincide with, the location of the corresponding source cell location. In one embodiment, the cells themselves may be identified by the locations of their centers, while the locations of the edges are identified by their end points. Thus, in a particular implementation, the ends of the length-one edges are based on a slightly different coordinate system than the one defining the cell locations; a left edge associated with cell centered at (0,0) may have the grid location "(0, 0) to (0,1)," and a top edge associated with cell (0, 0) may have coordinates (0,0) to 1, 0).

Once the edges of the individual cells are determined in block 318 of FIG. 3 by the processes described in conjunction with FIGS. 4a–4d, where the hyphen represents the word "through," the logic flows to a further block 319, which represents the joining of the length-one edges to form block edges. This is accomplished by examining each left cell edge in turn, and joining those terminating at (having) common terminating or end points. In the same way, the right, top, and bottom cell edges having common terminating points are joined. This results in a list of left, right, top, and bottom block edges, all with various "combined" lengths which depend on the text being processed, with the location of each such elongated edge being identified by the coordinates of its two end points.

From block 319 of FIG. 3, the logic flows to a block 320, which represents the grouping of the left, right, top and bottom combined block edges to form closed block regions. This is accomplished, in one embodiment, by starting with a top edge, and seeking (a) a left edge having an end point in common with the top edge, and (b) a right edge sharing an end point with the top edge. The unattached end points of the two vertical edges found in this manner are determined, and unattached top or bottom edges having end points in common with the left and right edges are found, to expand the attached boundaries of the block. When these top or bottom edges are attached, left or right edges are sought which have end points in common with the attached top or bottom edges, and so forth. The procedure alternates between searching for unattached horizontal (top or bottom) and vertical (left or right) block edges which have end points in common with the attached boundary. The procedure continues until all combined block edges have been combined with the boundary edges to form a closed region. In this fashion, the entire boundary of the block is defined.

Figure 5:
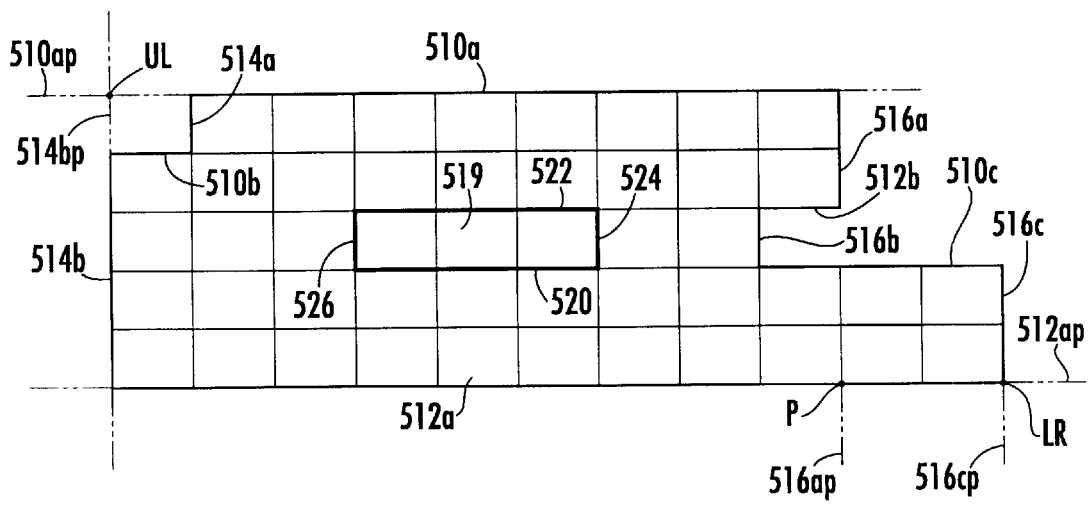
FIG. 5 represents a possible block of text, showing various boundaries, and also showing an inverse block.

As mentioned above, the process of finding the closed region defining a block is performed by starting with a top edge, and seeking (a) a left edge having an end point in common with the top edge, and (b) a right edge sharing an end point with the top edge. It should be noted that this is different from seeking (a) a left edge having an end point in common with the left end of the top edge and (b) a right edge having a point in common with the right end point of the top edge. FIG. 5 is a representation of a paragraph stored in memory in which the processes of block 319 have been applied. While cell locations are illustrated in phantom in FIG. 5 for reference, there is no actual cell information in the boundary information being processed in block 320 of FIG. 3. In FIG. 5, 510a, 510b, and 510c are each combined top edges, 512a and 512b are combined bottom edges, 514a and 514b are left edges, and 516a, 516b, and 516 are right edges. In the paragraph of FIG. 5, the text contains a "hole" 519 in the form of three spaces or white cells. This hole forms a "concave" or inverse block, in which the top edge is 520, the bottom edge is 522, the left edge is 524, and the right edge is 526. To a person simply viewing the two blocks, these designations appear to be incorrect or reversed, but they are correct when interpreted in view of the actual text locations. The processing of block 320 will connect the combined edges 520, 522, 524, and 526 of inverse block 519 just as it combines the other blocks of text. It is desirable, but not necessary, to eliminate consideration of such interior blocks, as there is no use performing a search for text within the inverse block defined by edges 520, 522, 524, and 526, as it contains no text. A less desirable aspect of such inverse blocks is that they may in fact themselves contain blocks of text which are associated with the exterior block, but which might be concealed by the presence of the inverse block. The inverse block is identified by having its left edge to the right of the right-most edge, and its top edge below its bottom-most edge. Searching is not performed within the inverse block. In order to attempt to find all applicable associations, searching is performed on (non-inverse) blocks lying within other non-inverse blocks, in conjunction with the search of the outermost block.

The text to be searched can be represented by the region between or within the various edges as determined in flow-chart block 320 of FIG. 3. However, reference to FIG. 5 illustrates that there may be many edges, and the specification of pluralities of edges is data-intensive. It is desirable to simplify the representation of the text block to be searched. Once the text block edges are found in flow-chart block 320 of FIG. 3, the logic flows to a flow-chart block 322, which represents determination of the bounding box enclosing the closed text block. In short, the bounding block is found by determining the upper left corner of the text block by projecting the left-most edge to its intersection with the uppermost edge, and by determining the lower right corner by projecting the right-most edge of the text block to its intersection with the lower-most text block edge. Referring to FIG. 5, the projection of the top-most text block edge 510a is designated 510ap, and the projection of the left-most edge 514b is designated 514bp. The intersection of these two projections is at a point designated upper-left or UL. Similarly in FIG. 5, the projection of bottom text block edge 512a is designated 512ap, the projection of right-most text block edge 516c is designated 516cp, and their intersection is designated LR. It is necessary to distinguish the outermost edge, or more particularly the top-most, bottom-most, left-most, and right-most, to prevent misidentification of the corners of the text block. For example, the projection of right text block edge 516ap intersects the projection of bottom-most text block edge 512ap at a point P, which does not correspond with the correct corner LR. The determination of the outermost edge is performed in a simple manner by examining the coordinates associated with each edge, and choosing for determination of the bounding box x and y values (corners) those which are at the extreme value. The location of the bounding box, as identified by the two corner locations UL and LR, is ultimately provided by the block finder, represented by block 210 of FIG. 2, to the pattern matching block 22 of FIG. 2. The output of logic block 322 of FIG. 3 is a stream of corner information identifying the locations of all the blocks within the text stream, as determined by the processes of the flow chart of FIG. 3.

The information relating to the locations of the corners of the text blocks, as determined by the block finder 210 of FIG. 2, is coupled by way of a path 212 to an additional data combiner block 214, which also receives the tokens from tokenizer 16. Data combiner block 214 inserts the corner information into the appropriate portion of the one-dimensional token stream. More particularly, the upper left corner information is inserted as a token at a location in the token stream preceding the first text token in the block, and the lower right corner information is inserted, also as a token, following the last text token in the block.

The pattern matcher 22 is readily adapted to use tokens representing the beginning and ending of blocks of text. For example, when seeking the proper noun ("Bill") associated with a pronoun ("he"), the pattern matcher is already configured to begin to look within the same sentence as the pronoun, working backward from the pronoun, to find an antecedent proper noun. If it fails to find the associated noun within the sentence, it continues the search to the paragraph. Modification of the pattern matcher to continue the search yet further, in the event that the desired association is not found in the paragraph containing the pronoun, to extend to the block identified by the block finder 210, is a simple matter, readily performed by a person skilled in the art, but which depends upon details of the pattern matcher.

Figure 7A:
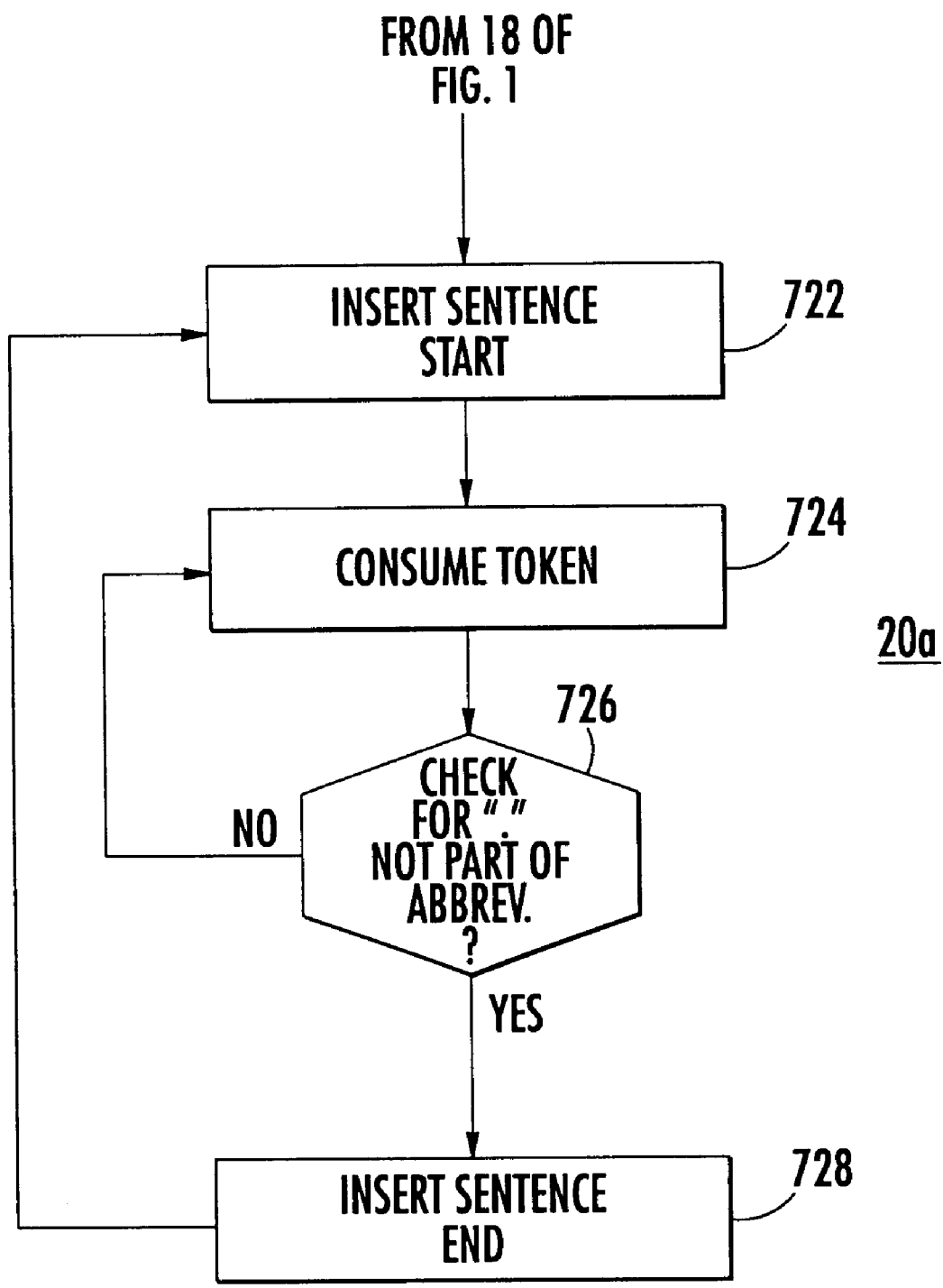
FIG. 7a is a simplified block diagram illustrating some details of a segmentation function in a prior-art arrangement.

FIG. 7a is a simplified logic diagram illustrating functional portions of the prior-art sentence segmentation block 20a of prior-art FIG. 1. In FIG. 7a, the tokens arrive at a block 722 from block 18 of FIG. 1. Block 722 represents the insertion of a sentence start in response to the appropriate token. From block 722, the logic flows to a block 724, which represents consumption of a token. The groupings of characters formed by the tokenizer are called tokens. From block 724, the logic flows to a decision block 726, which determines the presence or absence of a period (.) which is not part of an abbreviation (abbrev). So long as a period not part of an abbreviation is not found, the logic returns to block 724 by way of the NO output of decision block 726. When a period which is not part of an abbreviation is found, the logic leaves decision block 726 by the YES output, and arrives at a block 728, which represents the insertion of a sentence end. From block 728, the logic flows back to block 722, to continue searching for sentence starts and ends. It will be appreciated that the prior-art block 20a of FIG. 7a may be used in the arrangement of FIG. 2, and the benefits of the block finder 210 will still be realized.

Figure 7B:
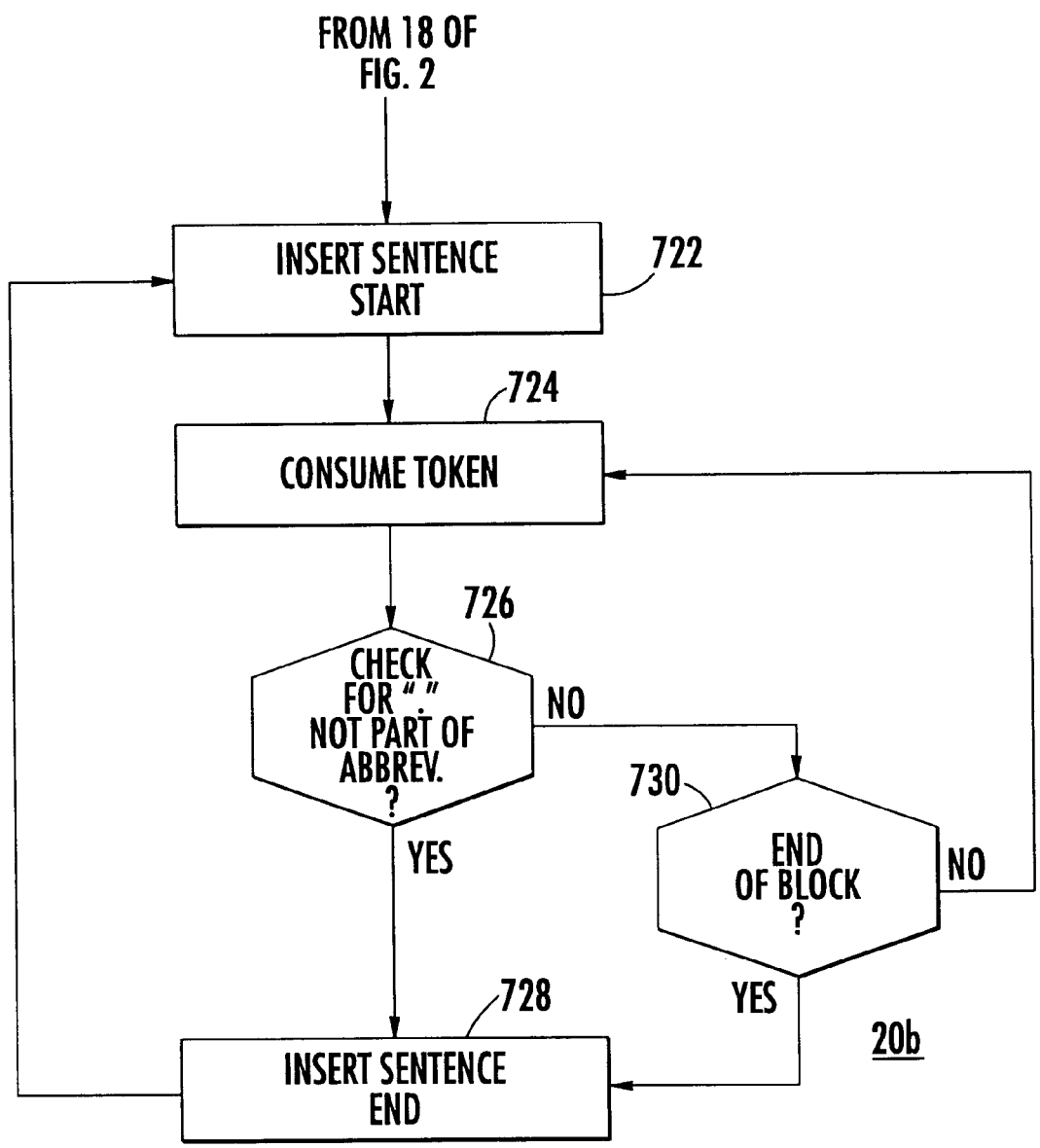
FIG. 7b is a corresponding diagram illustrating a segmentation block in accordance with an aspect of the invention, for providing an enhanced indication of the end of a sentence.

In order to take better advantage of the blocks identified by block finder 210 of FIG. 2, the sentence segmentation block may be amended to a logical structure equivalent to that represented by 20b of FIG. 7b. In FIG. 7b, the information is processed through decision block 726 as described in conjunction with FIG. 7a. If an end-of-sentence period is identified by decision block 726, the logic flows to block 728, as in FIG. 7a. However, if an end-of-sentence period is not identified by block 726, the logic leaves its NO output, and arrives at another decision block 730, which determines the existence of an end-of-block token. If no end-of-block token is identified, the logic returns by the NO output of block 730 to block 724, to continue seeking an end of the sentence. If an end-of-block token is identified, the logic by way of the YES output of 730, and logic flows to block 728. Thus, an end-of-sentence condition occurs in the presence of either (a) an end-of-sentence period or (b) an end-of-block in the absence of an end-of-sentence period.

The method according to the invention may help, in various contexts, to split the text into "bite-size" chunks for processing by the pattern matcher, force ends of sentences andor paragraphs even in the absence of punctuation in the text, andor find section headings in documents, find "topic" boundaries. Also, it may, depending upon the text, reorder tokens in the buffer, with the effect of putting text from columns in proper reading order. Similarly, it may limit the scope of information association (date, drug type, drug amount, arrests, and drug-carrying platforms within a visual block might be associated.

Other embodiments of the invention will be apparent to those skilled in the art. For example, while the forming of the boundaries of the block has been described as beginning with a top combined edge, and finding the vertical combined edges having identical termini, the procedure could as easily begin with a vertical combined edge, by seeking the two horizontal combined edges which terminate at the terminating grid locations of the vertical edge.

Thus, an information extracting block finding method (210) determines the structure of documents represented by one-dimensional text files. The method includes the step of extracting (312) from the text files at least some symbols representing two-dimensional spatial information. The text file is at least temporarily stored (312), using the spatial information, in a memory having a two-dimensional structure of grid cells (FIG. 5). For at least some of the grid cells (those in the middle of the cell array), at least two grid cells (412, 418: 414, 416) orthogonally adjacent to the grid cell under consideration (410) are examined. Each such grid cell under consideration (410) is assigned at least one of (a) left, (b) right, (c) top, and (d) bottom edge attributes: the attributes are assigned to those boundaries (410U, 410B, 410L, 410R) between the grid cell under examination in which one of (a) the grid cell under examination includes a text symbol (T) and the adjacent cell to the left lacks a text symbol (W), (b) the grid cell under examination includes a text symbol (T) and the adjacent cell to the right lacks a text symbol (W), (c) the grid cell under examination includes a text symbol (T) and the adjacent cell above the cell under examination lacks a text symbol (W), and (d) the grid cell under examination includes a text symbol (T), and the adjacent cell below the cell under examination lacks a text symbol (W), respectively. This generates a list of unit-length edges, each defined by its edge attribute (U,B,L,R) and its end locations. The end locations may be in the form of an ordered pair (x,y). Edges having the same left, right, top, or bottom edge attributes and identical end locations (that is, one end point in common) are combined or joined to thereby form multiple-unit-length left (514a, 514b, 524), right (516a, 516b, 516c, 526), top (510a, 510b, 510c, 520) and bottom (512a, 512b, 522) block or boundary edges defined by at least their left, right, top, and bottom attributes, and having locations defined by their end points. Each top and bottom block edge is associated with those left and right edges having common end points therewith, and each left and right edge is associated with those top and bottom edges having common end points therewith, to form closed two-dimensional regions. The spatial coordinates of a bounding box about each of the closed two-dimensional regions are determined. The block structure information thus produced may be used in various ways by the natural language processor. It can be used to refine the segmentation of the document ending sentences and paragraphs even when proper punctuation is not provided in the text. The blocking information can also be used to put a two-column document into reading order. When searching in the text for an information element which is associated with a particular other information element, the search is performed in that one of the bounding boxes which contains the other information element.

In a particular mode of the method, the step of determining the spatial coordinates of a bounding box includes the steps of identifying (i) the upper-left corner of the bounding box, and (ii) the lower-right corner of the bounding box. The upper-left corner is identified by selecting that point which represents the spatial coordinates of the intersection of (a) the projection of the topmost upper edge of each of the closed regions with (b) the projection of the leftmost of the left edges of the closed region. The lower-right corner is identified as that point which represents the spatial coordinates of (a) the projection of the lowermost lower edge of the closed region with (b) the projection of the rightmost of the right edges of the closed region.

In a particular version of the method, the step of performing the search includes the step of performing the search for the information element associated with a pronoun to that one of the bounding boxes including the pronoun.

In a preferred mode of the method of the invention, the text is prefiltered to eliminate single and double spaces between sentences. This step can be done before the step of examining two grid cells and assigning edge attributes. The prefiltering may include the step of deeming to be a cell occupied by text each grid cell which is occupied by a space symbol and which is (a) bounded on the left by a text grid cell and (b) bounded on the right by a text grid cells including space symbols. The preferred method also includes the step of deeming to be a set of four text cells (TTTT) those cells having the form TWWT, where T represents a text cell, and W represents a space or white cell. More particularly, this includes deeming to be a set of four text cells all right-left space symbol grid cell pairs bounded to the right and left by text.

What is claimed is:

1. An information extracting block finding method for determining the structure of documents represented by one-dimensional text files, said method comprising the steps of:

extracting from said text files at least some symbols representing two-dimensional spatial information;

using said spatial information, at least temporarily storing said text files in a memory having a two-dimensional structure defining multiple grid cells;

for at least some of said grid cells, examining at least two grid cells orthogonally adjacent to the grid cell under examination, and assigning from 0 to 4 of (a) left, (b) right, (c) top, and (d) bottom edge attributes to those boundaries between the grid cell under examination in which one of (a) the grid cell under examination includes a text symbol and the adjacent cell to the left lacks a text symbol, (b) the grid cell under examination includes a text symbol and the adjacent cell to the right lacks a text symbol, (c) the grid cell under examination includes a text symbol and the adjacent cell above the cell under examination lacks a text symbol, and (d) the grid cell under examination includes a text symbol, and the adjacent cell below the cell under examination lacks a text symbol, respectively, to thereby generate a list of cell edges, each defined by its edge attribute and its end locations;

combining cell edges having the same left, right, top, or bottom edge attributes and an identical end location, to thereby form left, right, top and bottom block edges, respectively, defined by at least one of said left, right, top, and bottom attributes, and having locations defined by their end points;

associating each top and bottom block edge with those left and right edges having common end points therewith, to form closed two-dimensional regions; and determining the spatial coordinates of a bounding box about each of said closed two-dimensional regions.

2. A method according to claim 1, wherein said step of determining the spatial coordinates of a bounding box includes the steps of:

selecting (i) that point which represents the spatial coordinates of the intersection of (a) the projection of the topmost upper block edge of each of said closed regions with (b) the projection of the leftmost of said left block edges of said closed region, and (ii) that point which represents the spatial coordinates of the intersection of (a) the projection of the lowermost lower block edge of said closed region with (b) the projection of the rightmost of said right block edges of said closed region, to thereby define said coordinates of said bounding box.

3. A method according to claim 1, further comprising the step of:

when searching in said text for an information element which is associated with a particular other information element, performing said search in that one of said bounding boxes which contains said other information element.

4. A method according to claim 3, wherein said step of limiting said search includes the step of limiting the search for the information element associated with a pronoun to that one of said bounding boxes including said pronoun.

5. A method according to claim 1, further comprising, before said step of examining at least two grid calls and assigning edge attributes, the step of:

prefiltering said text to eliminate spaces between sentences.

6. A method according to claim 5, wherein said step of prefiltering further comprises, before said step of examining the four grid cells and assigning edge attributes, the step of:

deeming to be cells occupied by text all grid cells which are occupied by space symbols and which are (a) bounded on the left by grid cells including text characters and (b) bounded on the right by grid cells including space symbols.

7. A method according to claim 6, further comprising the step of:

deeming to be a set of four text cells all right-left space symbol grid cell pairs bounded to the right and left by text characters.

8. A method according to claim 1, further comprising the step of reordering tokens to put multi-column text into logical reading order.

9. A method according to claim 1, further comprising the step of ending sentence and paragraph structure components when an end of block structure component is reached.

* * * * *